United States Patent [19]

Murakami et al.

[11] 4,456,510
[45] Jun. 26, 1984

[54] PROCESS FOR MANUFACTURING CHLORINE DIOXIDE

[75] Inventors: Katsuyuki Murakami, Maebashi; Kaoru Hirakata, Yoshioka; Fumio Ishizaka, Maebashi; Shinichi Shimoda, Fujimi; Reiichi Itai, Maebashi, all of Japan

[73] Assignee: The Japan Carlit Co., Ltd., Tokyo, Japan

[21] Appl. No.: 443,189

[22] Filed: Nov. 22, 1982

Related U.S. Application Data

[62] Division of Ser. No. 258,545, Apr. 28, 1981.

[30] Foreign Application Priority Data

May 13, 1980 [JP] Japan .................................. 55-63121

[51] Int. Cl.³ .............................................. C25B 1/26
[52] U.S. Cl. .................................................. 204/101
[58] Field of Search ....................................... 204/101

[56] References Cited

U.S. PATENT DOCUMENTS

| | | | |
|---|---|---|---|
| 3,607,027 | 9/1971 | Westerlund | 204/101 |
| 3,904,495 | 9/1975 | Eng et al. | 204/101 |
| 4,129,484 | 12/1978 | Larsson | 204/101 |

Primary Examiner—R. L. Andrews
Attorney, Agent, or Firm—Frishauf, Holtz, Goodman & Woodward

[57] ABSTRACT

Chlorine dioxide is produced by electrolysis of a solution of chlorite and by using a compact apparatus which provides continuously a uniform concentration of chlorine dioxide, which can be operated easily, which discharges a spent electrolyte that can be treated easily and which achieves highly efficient use of chlorite and high current efficiency.

14 Claims, 8 Drawing Figures

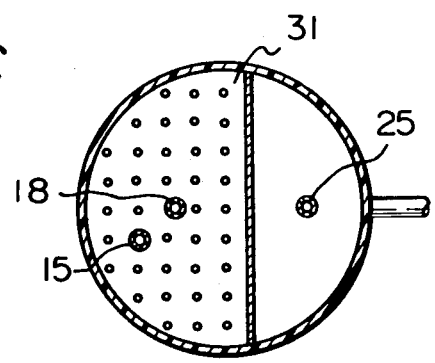

PROCESS FOR MANUFACTURING CHLORINE DIOXIDE

This is a division of application Ser. No. 258,545 filed Apr. 28, 1981.

BACKGROUND OF THE INVENTION

1. Field of the Invention

This invention relates to a process for electrolytic production of chlorine dioxide used in bleaching of paper pulp and disinfection or deodorization of potable water. More particularly, this invention relates to a process for producing chlorine dioxide by electrolyzing a solution of alkali metal chlorite supplied to an anode compartment in a diaphragm electrolytic cell.

2. Description of the Prior Art

Chlorine dioxide is produced by a chemical method wherein chlorate or chlorite is used as a starting material or by an electrochemical method wherein chlorine dioxide is generated by electrolysis of chlorite. The method which obtains chlorine dioxide from chlorate uses a reducing agent that acts on the chlorate in a strong acid solution and the method has various modifications according to the type of reducing agent. A typical example uses sodium chloride as the reducing agent (e.g. U.S. Pat. No. 3,563,702). Examples of the chemical method include decomposition of chlorite with acid (e.g. Swiss Patent No. 527,126) and reaction between chlorite and chlorine (e.g. French Patent No. 2,086,624). One example of the electrochemical method is diaphragm electrolysis wherein a chlorite solution is used as anolyte and caustic alkali or sodium chloride solution is used as catholyte (e.g. U.S. Pat. No. 3,763,006). In any of these methods, chlorine dioxide whose concentration is more than 15 vol% is explosive and hence is usually recovered after being diluted with an inert gas such as air.

The chemical method, particularly the one that uses chlorate is primarily used to produce chlorine dioxide for pulp bleaching and is in most cases operated on a relatively large scale. Liquid chlorine is conventionally used to disinfect potable water, but it has a tendency to form trihal methane (THM and primarily chloroform) being a suspected carcinogen in water, so researchers are getting interested in the use of chlorine dioxide instead of liquid chlorine (Journal of the Society of Waterworks, No. 546, March 1980, pp. 123-124). For use in water treatment plants, a small system for producing chlorine dioxide is a must. For example, a chemical system that is designed to generate less than about 100 kg of chlorine dioxide per day involves a side reaction and with this system, it is difficult to control the complex mechanism of the reaction of the formation of chlorine dioxide, and hence a lot of equipment cost and labor is required to achieve the proper control of chlorine dioxide produced. What is more, such system is not completely safe. On the other hand, the electrochemical method is adaptive to a small-scale apparatus, involves less side reaction and produces pure chlorine dioxide, is capable of controlling the production of chlorine dioxide simply by controlling electrolytic current according to a change in the quality of water supplied to the water treatment plant or a change in the demand for water at different time during the day. Chlorine dioxide may explode at high concentrations, but unlike the chemical method the electrochemical method is very safe because when air blowing is suspended by power failure or some other reasons, the production of chlorine dioxide is also stopped.

The conventional electrochemical method for production of chlorine dioxide is performed either batchwise or continuously. In the batchwise process, a chlorite solution in an anode compartment in the diaphragm electrolytic cell is electrolyzed until the chlorite content becomes small, and thereafter, the anolyte is replaced by a fresh supply for starting electrolysis again. In the continuous process, a chlorite solution is continuously supplied to the anode compartment to maintain the chlorite content constant throughout the electrolysis. One defect of the batchwise process is that the operation is suspended at every anode replacement which is usually done every 1 to 3 days. To extend the replacement interval, much anolyte is necessary, resulting in an increase in equipment cost and installation area. In addition, the spent anolyte contains a considerable amount of chlorite and chlorine dioxide dissolved therein, and this means low efficiency in use of chlorite. Since a large amount of spent anolyte is discharged at one time, its treatment is difficult and requires a lot of personnel expenses. The continuous process provides a uniform concentration of chlorine dioxide, but much chlorine dioxide is dissolved away in the anolyte continuously discharged, and such discharged catholyte is difficult to treat, and the efficiency in use of chlorite is low. A continuous method is known that is designed for increasing the efficiency in use of chlorite by supplying a concentrated solution of chlorite prepared by adding a chlorite crystal to the discharged anolyte. But even in this method, salts in the crystal and those produced during electrolysis gradually build up and anolyte replacement is unavoidable. What is more, it is difficult to supply a constant amount of the crystal. Therefore, there is a great demand for an electrolytic process for production of chlorine dioxide which provides continuously a uniform concentration of chlorine dioxide, can be carried out with a compact apparatus, can be operated easily, discharges a spent electrolyte that can be treated easily, and which achieves highly efficient use of chlorite and high current efficiency.

SUMMARY OF THE INVENTION

It is an object of the invention, therefore, to provide a process for producing chlorine dioxide by electrolysis of a solution of chlorite which provides continuously a uniform concentration of chlorine dioxide, which can be operated easily, which discharges a spent electrolyte that can be treated easily and which achieves highly efficient use of chlorite and high current efficiency.

It is another object of this invention to provide a compact apparatus for production of chlorine dioxide by electrolysis of a solution of chlorite which provides continuously a uniform concentration of chlorine dioxide, which can be operated easily, which discharges a spent electrolyte that can be treated easily and which achieves highly efficient use of chlorite and high current efficiency.

Other objects and advantages of the present invention may become apparent to those skilled in the art from the following description and disclosure.

BRIEF DESCRIPTION OF THE DRAWINGS

FIGS. 3A, 3B and 3C are schematic cross section views taking along line A—A', B—B' and C—C' in FIG. 2, respectively.

DETAILED DESCRIPTION OF THE PREFERRED EMBODIMENT

Figure 1:
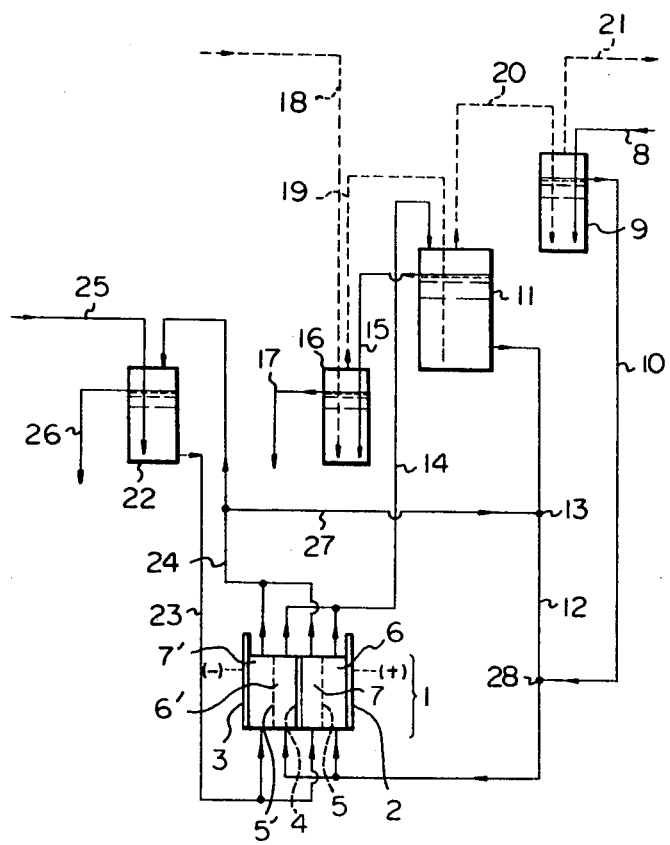
FIG. 1 is a schematic flow sheet of the process of this invention according to one embodiment.

This invention provides a process for generating chlorine dioxide by electrolysis of a solution of chlorite, wherein a solution of alkali metal chlorite is supplied to a supply tank, an overflow from said supply tank is combined with an anolyte circulating between an anode compartment in a diaphragm electrolytic cell and a stripping tank (the pH of said anolyte has been adjusted to a suitable value with part of the circulating catholyte) before the latter enters the anode compartment, the combined fluid is sent to the anode compartment where it is electrolyzed and from which it is returned to the stripping tank, an anolyte overflow from said stripping tank is discharged from the system through an auxiliary stripping tank, air directed into the auxiliary stripping tank is then supplied to the stripping tank to strip the anolyte of the chlorine dioxide generated in the anode compartment, said air containing chlorine dioxide is advanced into the supply tank and discharged from the system, the catholyte being circulated between a cathode compartment in the electrolytic cell and a circulation tank, diluting water being added to said circulation tank, part of the catholyte being discharged from the system, another part of the catholyte being combined with said circulating anolyte at a neutralization point upstream of the point where it is combined with the overflowed chlorite solution from a supply tank. The process of this invention is particularly suitable for continuous operation, but it may be operated batchwise for a certain concentration of chlorite.

One embodiment of the process of this invention is hereunder described by reference to the accompanying FIGS. 1 to 4. In the drawings, a diaphragm electrolytic cell 1 may be of bipolar or unipolar design, and the following description assumes that the cell is of bipolar design comprising a terminal anode 2, a terminal cathode 3, and an intermediate electrode 4, and the cell is divided into anode compartments 6, 6' and cathode compartments 7, 7' by diaphragms 5, 5' placed between each electrode. The anode is made of an electrically conductive and corrosion-resistant substrate such as titanium which is coated on the anode compartment side with a common anode catalytic active material such as a metal of platinum group, an alloy thereof, an oxide thereof, magnetite or ferrite. The diaphragm may be made of ceramic, asbestos or cation exchange membrane, and preferably it is made of a fluoro-carbon cation exchange membrane having high permselectivity and durability. To achieve a compact configuration, the electrolytic cell is preferably of bipolar, filter press type.

The solution of alkali metal chlorite in continuously supplied through a pipe 8 which extends close to the bottom of a supply tank 9. Examples of the alkali metal are sodium, potassium and lithium, and the sodium is commonly used. The chlorite solution from the tank 9 flows down an overflow pipe 10 and is combined at the junction 28 with the circulatory anolyte, which has been adjusted to a predetermined pH through mixing with part of the circulating catholyte at a junction 13 on an anolyte supply pipe 12 connected between a stripping tank 11 and the electrolytic cell 1. The mixture obtained at the junction 28 is then directed to the anode compartment 6, 6'. The electrolyzed chlorite solution is returned to the stripping tank 11 through an anolyte return pipe 14. Part of the anolyte flows down an overflow pipe 15 which extends close to the bottom of an auxiliary stripping tank 16 from which it is discharged to the outside of the system through a pipe 17.

Figure 2:
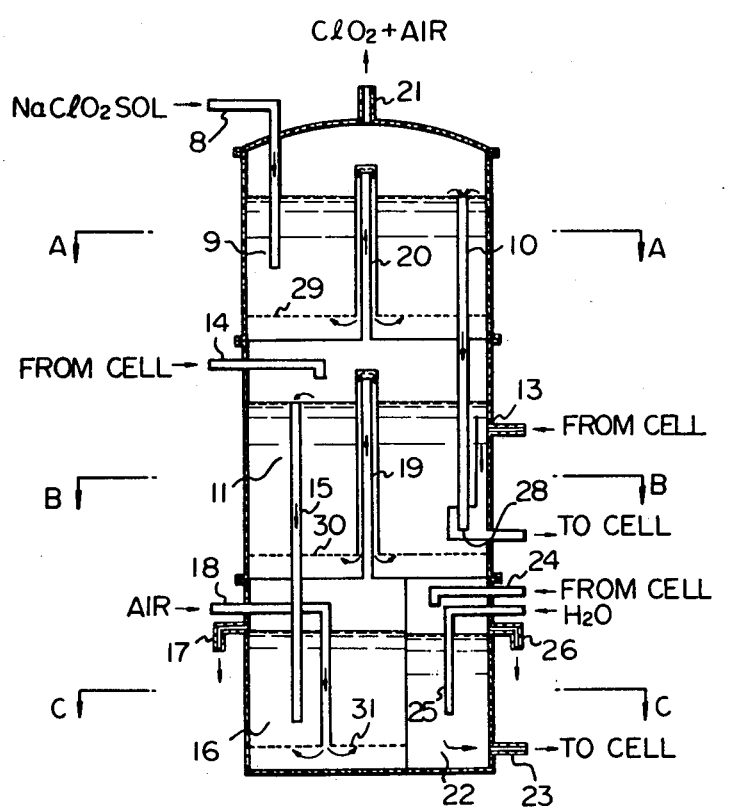
FIG. 2 is a schematic longitudinal sectional view of one embodiment of an apparatus except for an electrolytic cell according to this invention.
Figure 3A:
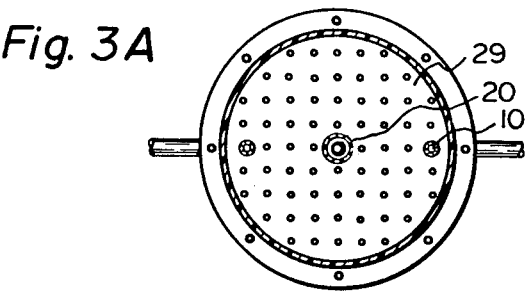
Figure 3B:
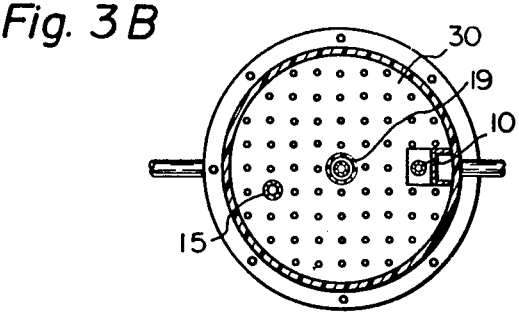
Figure 4A:
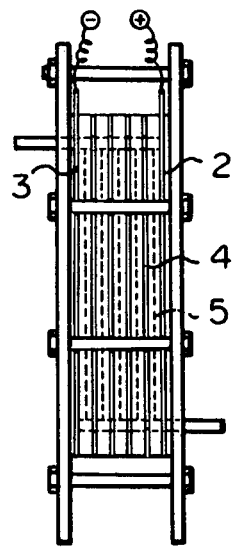
FIGS. 4A, 4B and 4C are a front view, a left side view and a right side view of an electrolytic cell of a filter-press assembly of bipolar design having 5 unit cells according to this invention.
Figure 4B:
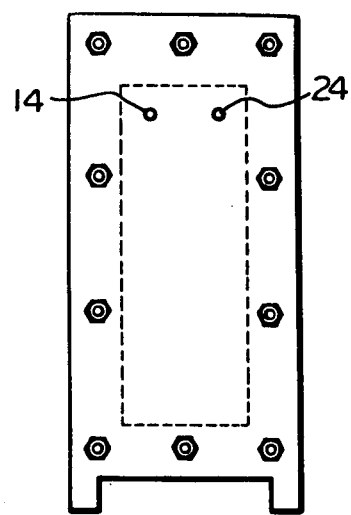
Figure 4C:
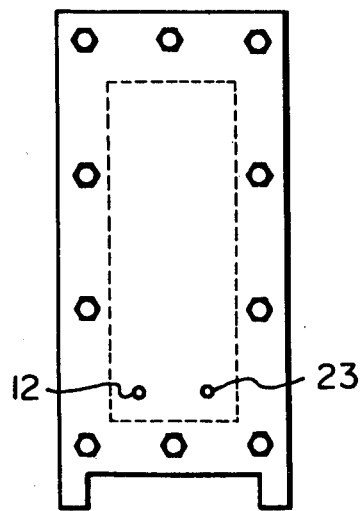

Air is introduced through a pipe 10 which extends close to the bottom of an auxiliary stripping tank 16 to strip the anolyte of the dissolved chlorine dioxide through gas-liquid contact, and the mixture of air and chlorine dioxide then is directed to the stripping tank 11 through a pipe 19. In the stripping tank 11, the anolyte is stripped of the dissolved chlorine dioxide to a given gas-liquid equilibrium concentration. The chlorine dioxide diluted with air is then directed to the supply tank 9 through a pipe 20, and from that tank, it is recovered through a discharge pipe 21. In FIG. 2, numerals 29, 30 and 31 are distributors (perforated plates) through which introduced air is uniformly dispersed.

The catholyte in a circulation tank 22 is directed to the cathode compartments 7, 7' of the electrolytic cell 1 through a pipe 23, and after being electrolyzed in that cell, the catholyte is returned to the circulation tank 22 through a return pipe 24, thus circulating between the circulation tank 22 and the cathode compartments 7, 7'. To inhibit the increase in the alkali concentration of the catholyte, diluting water is kept supplied to the circulation tank 22 through a pipe 25 during electrolysis, and part of the catholyte is discharged from the system through a pipe 26, and another part is branched from the catholyte return pipe 24 and sent through an alkali supply pipe 27 which is connected to the anolyte supply pipe 12 at a junction 13 upstream the junction 28, and at that junction 13, the circulating anolyte is neutralized with the alkali in the catholyte. Alternatively, the alkali may be neutralized with hydrochloric acid supplied to the circulation tank 22 through the pipe 25.

In an especially preferred embodiment (see FIGS. 2 and 3), the apparatus is arranged in a single cylindrical reactor (except for the electrolysis cell). The circulation tank 22 for the catholyte and the auxiliary stripping tank 16 are located next to each other on the lower floor of the reactor. The stripping tank 11 is arranged above. The supply tank 9 forms the upper floor of the reactor. The tanks which are arranged one above the other are connected with each other via gas and liquid pipes as described before. These pipes are located substantially in the interior of the reactor. The air which is blown in for stripping the anolyte rises from the auxiliary stripping tank into the supply tank 9 via the stripping tank 11. The mixture of air and $ClO_2$ flows first upwards (up to above the level of the liquid in the stripping tank 11 or the supply tank 9) through the pipes 19 or 20 in the manner to be seen from FIG. 2 and then downwards below the perforated plate 30 and 29, respectively, through a concentric exterior pipe.

When a D.C. current from a D.C. source (not shown) is applied to the electrolytic cell 1, an electrode reaction represented by the formula (1) takes place in the anode compartments 6, 6' to generate chlorine dioxide. Alkali and hydrogen are evolved in the cathode compartments 7, 7' as in the conventional electrolysis of sodium chloride.

$$ClO_2^- \rightarrow ClO_2 + e \tag{1}$$

The chlorine dioxide evolved through the reaction of (1) is highly soluble and dissolves in the circulating anolyte, and air blown into the stripping tank 11 reduces the chlorine dioxide content in the anolyte until a gas-liquid equilibrium in the stripping tank is obtained, and the displaced chlorine dioxide is recovered in the form of a mixture with air. Since only a low voltage is required for decomposing the chlorite ion, only a little electrical power is required to produce chlorine dioxide. Even if sodium chloride and other salts are present in the reaction system, no chlorine is evolved, because the voltage required for decomposing the chlorite ion is lower than that required for decomposing chloride ion. If a high concentration of chlorite ion is supplied to the electrolytic cell 1, the pH of the anolyte is usually held close to neutral, but when the concentration of chlorite ion is less than about 40 g/l, the cell voltage increases slightly and both chlorite ion and chloride ion are electrically discharged to evolve chlorine as well as chlorine dioxide. The evolved chlorine is soon hydrolyzed or dissolved in the anolyte, and the pH of the anolyte is gradually decreased due to the hydrochloric acid produced. When the pH of the anolyte is reduced to about 2, chlorine dioxide is evolved and the presence of chlorite ion is substantially zero, and hence chlorine gas is evolved. Accordingly, to achieve efficient use of chlorite and to discharge spent anolyte that is substantially free of chlorite ion, the pH of the anolyte at the outlets of the anode compartments 6, 6' must be lower than a certain level which is 2 for the purposes of this invention. To meet this end, the amount of anolyte circulating between the anode compartments 6, 6' and the stripping tank 11 is controlled. Usually, the flow rate and concentration of the chlorite solution are determined by a theoretical consumption amount corresponding to the electrochemical equivalent amount of chlorite ion (2.518 g per ampere hour). If it is assumed that the so determined amount of chlorite ion is diluted with the circulating anolyte before it enters the anode compartments 6, 6' where almost all of the ion is decomposed to chlorine dioxide and electron, the flow rate of the circulating anolyte is determined by the concentration of chlorite ion in the mixture of chlorite solution and anolyte. This means the flow rate of the circulating anolyte is the ratio of the amount of chlorite ion supplied, to the predetermined concentration of chlorite ion in the mixture of chlorite solution and anolyte. In this invention, the concentration of chlorite ion in the mixture of chlorite solution and anolyte is limited to a range of from 10 to 40 g/l. If the concentration is lower than 10 g/l, the current efficiency drops significantly while the cell voltage increases greatly to make economical electrolysis impossible. If the concentration is higher than 40 g/l, no drop in the pH of the anolyte occurs, and since less anolyte is circulated, not all of the chlorine dioxide produced can be dissolved in the circulating anolyte flowing through the return pipe 14, and in consequence, part of the chlorine dioxide assumes a gaseous form which is undesirable for its explosiveness.

If the pH of the anolyte at the outlets of the anode compartments 6, 6' is adjusted to lower than 2, not only chlorine dioxide but also chlorine gas is evolved, but the gas mixture from the stripping tank 11 is directed to the chlorite solution in the supply tank 9, and chlorine reacts with the chlorite ion to form chlorine dioxide by taking the following reaction course:

$$2ClO_2^- + Cl_2 \rightarrow 2ClO_2 + 2Cl^- \tag{2}$$

Therefore, the gas discharged through the pipe 21 comprises only air and chlorine dioxide and does not contain chlorine. The chlorine dioxide and chlorine dissolved in the anolyte which has overflowed into the auxiliary stripping tank 16 is removed by an additional supply of fresh air, and the effluent discharged through the pipe 17 contains no chlorine dioxide, and there occurs little loss of chlorine dioxide produced by electrolysis. In the reaction represented by the formula (2), the chlorite ion supplied is consumed by chlorine gas, but since mol of chlorine yields 2 mols of chlorine dioxide, there is no electrochemical stoichiometric loss.

The anolyte whose pH has been adjusted to less than 2 is then supplied from the stripping tank 11 to the anode compartments 6, 6', but before it dilutes the chlorite solution, it is neutralized with the alkali produced as a by-product in the cathode compartments 7, 7'. By this neutralization, the pH of the anolyte is adjusted to a level between 3 to 8. If the pH is less than 3, the chlorine evolved is hydrolyzed to hydrochloric acid, and if it is mixed with the chlorite ion, said ion is easily activated and decomposed as represented by the following formula (3) before it is electrolyzed. Since this reaction produces only 4 mols of chlorine dioxide from 5 mols of chlorite ion, an electrochemical stoichiometric loss occures in the reaction.

$$5ClO_2^- + 4HCl \rightarrow 4ClO_2 + 5Cl^- + 2H_2O \tag{3}$$

If the pH is higher than 8, the dissolved chlorine dioxide easily returns to chlorite ion. Preferably, the pH of the anolyte is neutralized to a level in the range of from 4 to 7. The hypochlorite ion produced by hydrolysis of chlorine also easily reacts with the chlorite ion at an anolyte pH of 3 to 8, following the course represented below, but no electrochemical stoichiometric loss occurs in this reaction.

$$2ClO_2^- + ClO^- + H_2O \rightarrow 2ClO_2 + Cl^- + 2OH^- \tag{4}$$

The amount of chlorine dioxide is substantially proportional to electrolytic current and a constant concentration of chlorine dioxide is kept produced, and the concentration of chlorine dioxide produced is controlled by the amount of air supplied to the system. For the purposes of this invention, the concentration of chlorine dioxide is limited to a level between 3 and 15 vol%. If the concentration is lower than 3%, the huge amount of air to be supplied reduces the operation efficiency, and if the concentration is higher than 15%, the possibility of explosion is increased. Preferably, the concentration of chlorine dioxide is held in a range between 5 and 12%. During electrolysis, the bath temperature of the stripping tank 11 is held at between 10° and 90° C. A temperature lower than 10° C. is not economical because of increased cell voltage, and a temperature higher than 90° C. accelerates corrosion or other attacking of the equipment, which also results in inefficient operation. A diaphragm made of cation exchange membrane is preferred to a ceramic diaphragm because it minimizes the migration of hydroxyl ion into the anode compartment and hence inhibits the formation of a by-product chlorate in the anode compartment, with the result that electrolysis is performed at high current efficiency.

Chlorine dioxide is unstable and may cause explosion at high concentration, so the system is preferably operated under vacuum by installing a suction pump or ejector downstream of the pipe 21. To protect the diaphragm or to prevent the migration of an interfering ion through the diaphragm, the circulation tank 22 must also be placed in vacuum so that the pressures in the anode and cathode compartments separated by the diaphragm are almost equal. It is also necessary to circulate the catholyte at a flow rate substantially equal to that of the anolyte. To prevent the migration of hydroxyl ion through the diaphragm, the pressure in the anode compartment is usually higher than that in the cathode compartment by not more than 100 mmH$_2$O, preferably not more than 50 mmH$_2$O. Another reason to place the circulation tank 22 in vacuum is to dilute the evolved hydrogen gas until its concentration is less than the lower limit for explosion.

The start and stop of the system can be controlled by loading an automatic arithmetic unit with the electrolytic current to be applied to the electrolytic cell and the amount of supply of the chlorite solution. What is more, optimum control of the amount of and concentration of chlorine dioxide to be produced can be achieved by modifying the electrolytic current and the amount of air supply.

According to the method of this invention, electrolysis can be accomplished while the chlorite solution is supplied to the anode compartment of the diaphragm electrolytic cell by way of the supply tank. In addition, by letting air pass through the auxiliary stripping tank, stripping tank and supply tank successively, chlorine-free chlorine dioxide of high purity and constant concentration can be recovered continuously without interrupting the operation. The concentration of chlorine dioxide being recovered can be readily modified by controlling the electrolytic current. Since chlorine dioxide gas that contains chlorine is purified in the supply tank, highly efficient decomposition of the chlorite is also possible. Almost all of the residual chlorine dioxide is recovered in the auxiliary stripping tank and the efficiency of use of the chlorite is almost 100%. Therefore, the waste anolyte continuously coming out of the system can be discharged into watercourses without requiring any complex treatment other than neutralization. The continuous electrolytic process of this invention achieves a current efficiency of as high as 88 to about 90%. This way, the process of this invention is so simple to operate that it can be automated to reduce labor requirements greatly.

The following examples are given to further illustrate this invention, but it should be understood that the invention is by no means limited thereto. On the contrary, they are given only to clarify some of the essential embodiments of the present invention.

EXAMPLE 1

A system for continuous production of chlorine dioxide by electrolysis was installed as represented in FIG. 1. The supply tank, stripping tank, auxiliary stripping tank and catholyte circulating tank were made of rigid vinyl chloride cylinders that measured 200 mm (I.D.)×450 mm (height), 250×600 mm, 200×500 mm, and 200×500 mm; the air inlet pipe, gas pipes and all other pipes for gas stream were made of 13A rigid vinyl chloride; and the overflow pipes, anolyte supply pipe and all other pipes for liquid stream were made of 16A rigid vinyl chloride. The electrolytic cell used a Nafion diaphragm, a Du Pont sulfonated fluorocarbon cation exchange membrane, and the cell was a filter-press assembly of bipolar design having 5 unit cells each comprising an anode compartment separated from a cathode compartment by the diaphragm. The assembled cell had the outer dimensions of 550 mm (height)×350 mm (width)×250 mm (thickness). Each anode comprised a 3 mm thick titanium plate having a platinum coating on the anode compartment side. As anolyte, a sodium chlorite solution was supplied that contained 225 g/l of chlorite ion and 20–25 g/l of sodium chloride. As catholyte, an aqueous solution of caustic soda was supplied at 25 g/l only at the start of the operation. The anolyte and catholyte were circulated by respective magnet pumps, and air was forced into the auxiliary stripping tank with a Nash pump. The system was operated for a continuous period of about 3 weeks an electrolytic current of 100 amperes, with the sodium chlorite solution being supplied to the supply tank at a rate of 93 ml/min and air supplied at 67 liters/min (N.T.P.). To hold the concentration of chlorite ion after dilution with the circulating anolyte at 20 g/l, the anolyte was circulated at a rate of about 1.0 liter/min. The pH of the circulating anolyte before it was used to dilute the chlorite ion was adjusted to about 5 with the alkali by-product, and the bath temperature of the stripping tank was held at about 40° C.

During the electrolysis, the pH of the anolyte at the outlets of the anode compartments was about 1.3, and chlorine dioxide having a purity of 100 mol% was produced continuously in an amount of about 1.12 kg-ClO$_2$/hr. Its concentration remained substantially constant, i.e. ca. 10.1 vol%. The average cell voltage and current efficiency during electrolysis were about 5.3 volts and 88.9%, respectively. The amount of chlorine detected in the product chlorine dioxide was subtantially zero. The waste anolyte contained about 0.3 g/l of NaClO$_2$, 30 to 40 g/l of NaCl, and 10 to 20 g/l of NaClO$_3$, and the efficiency of use of the chlorite ion was 99.9%. Diluting water was supplied at 450 ml/min, and the alkali concentration of the catholyte in the circulation tank remained substantially constant at 24.6–25.5 g/l.

EXAMPLES 2 to 4

Electrolysis of sodium chlorite was conducted under the same operating conditions as used in Example 1 except for the concentration of chlorite ion after dilution, the flow rate of the circulating anolyte, the pH of the anolyte after neutralization, and the bath temperature of the stripping tank. The results are shown in Table 1.

TABLE 1

| Ex. | ClO₂⁻ after dilution (g/l) | circulating flow rate (l/min) | pH after neutralization | bath temp. (°C.) | pH at the outlet of anode compartment | conc. of ClO₂ (V %) | amount of product ClO₂ (kg/h) | cell voltage (V) | current efficiency (%) | efficiency of use of ClO₂⁻ (%) | conc. of Cl⁻ in product ClO₂ (V %) |
|---|---|---|---|---|---|---|---|---|---|---|---|
| 2 | 35 | 0.6 | 5.0 | 40 | 1.8 | 10.2 | 1.13 | 5.1 | 89.8 | 99.5 | 0 |
| 3 | 20 | 1.0 | 7.0 | 40 | 1.5 | 10.0 | 1.11 | 5.3 | 88.2 | 99.8 | 0 |
| 4 | 20 | 1.0 | 5.0 | 70 | 1.1 | 10.2 | 1.13 | 4.7 | 89.8 | 99.9 | 0 |

COMPARATIVE EXAMPLE 1

Electrolysis of sodium chlorite was conducted under the same operating conditions as used in Example 1 except that no supply tank was used. The results are shown in Table 2.

TABLE 2

| Comp. Ex. | ClO₂⁻ after dilution (g/l) | circulating flow rate (l/min) | pH after neutralization | bath temp. (°C.) | pH at the outlet of anode compartment | conc. of ClO₂ (V %) | amount of product ClO₂ (kg/h) | cell voltage (V) | current efficiency (%) | efficiency of use of ClO₂⁻ (%) | conc. of Cl⁻ in product ClO₂ (V %) |
|---|---|---|---|---|---|---|---|---|---|---|---|
| 1 | 20 | 1.0 | 5.0 | 40 | 1.3 | 9.0 | 1.01 | 5.2 | 80.2 | 99.9 | 0.5 |

COMPARATIVE EXAMPLES 2 TO 5

Electrolysis of sodium chlorite was conducted under the same operating conditions as used in Example 1 except for the concentration of chlorite ion after dilution, the flow rate of the circulating anolyte, and the pH of the anolyte after neutralization. The results are shown in Table 3.

TABLE 3

| Comp. Ex. | ClO₂⁻ after dilution (g/l) | circulating flow rate (l/min) | pH after neutralization | pH at the outlet of anode compartment | conc. of ClO₂ (V %) | amount of product ClO₂ (kg/h) | cell voltage (V) | current efficiency (%) | ClO₂⁻ in waste anolyte (g/l) | efficiency of use of ClO₂⁻ (%) | conc. of Cl⁻ in product ClO₂ (V %) |
|---|---|---|---|---|---|---|---|---|---|---|---|
| 2 | 5 | 4.0 | 5.0 | 1.2 | 9.4 | 1.04 | 5.9 | 82.6 | 0.2 | 99.9 | 0 |
| 3* | 50* | 0.4 | 5.0 | — | — | — | — | — | — | — | — |
| 4 | 20 | 1.0 | 1.1 (no neutralization) | 0.9 | 8.5 | 0.94 | 6.2 | 74.7 | 0.2 | 99.9 | 0 |
| 5 | 20 | 1.0 | 9.0 | 2.2 | 9.0 | 1.00 | 5.2 | 79.7 | 5.5 | 98.5 | 0 |

*Not all chlorine dioxide produced that flowed through the anolyte return pipe could be dissolved in the circulating anolyte any longer, and part of it was present in a gaseous form. So, the operation was suspended because of increased possibility of explosion.

What is claimed is:

1. An electrolytic process for producing chlorine dioxide comprising:
    (a) electrolytically producing an anolyte having chlorine dioxide dissolved therein in an anode compartment of an electrolytic cell,
    (b) forwarding said anolyte from said anode compartment to a stripping tank,
    (c) supplying a first mixture comprising air and chlorine dioxide obtained from an auxiliary stripping to said stripping tank,
    (d) stripping in said stripping tank, a portion of the chlorine dioxide dissolved in said anolyte received from said anode compartment with the air contained in said first mixture to form a second mixture comprising air and chlorine dioxide and a spent anolyte,
    (e) forwarding a first portion of said spent anolyte from said stripping tank to said auxiliary stripping tank,
    (f) supplying fresh air to said auxiliary stripping tank,
    (g) stripping in said auxiliary stripping tank, said first portion of spent anolyte with the air supplied to said auxiliary stripping tank to form said first mixture comprising air and chlorine dioxide and a second spent anolyte,
    (h) discharging said second spent anolyte from said auxiliary stripping tank,
    (i) forwarding said second mixture comprising air and chlorine dioxide from said stripping tank to a supply tank containing a chlorite solution to thereby form a mixture of air and subtantially pure chlorine dioxide,
    (j) forwarding a first portion of the catholyte obtained from the catholyte compartment of said electrolytic cell to a circulation tank,
    (k) supplying a diluent to said circulation tank to thereby dilute and control the pH of said first portion of catholyte contained therein,
    (l) discharging a first part of said diluted catholyte from said circulation tank,
    (m) forwarding a second part of said diluted catholyte to the cathode compartment of said electrolytic cell,
    (n) contacting a second portion of said catholyte obtained from the cathode compartment with a second portion of said spent anolyte obtained from the stripping tank to obtain a first anolyte mixture having a pH of from 3 to 8.
    (o) contacting said first anolyte mixture with a chlorite solution obtained from said supply tank to form a second anolyte mixture having a chlorite ion concentration of from 10 to 40 g/l.
    (p) supplying said second anolyte mixture to the anode compartment of said electrolytic cell, and (q) recovering subtantially pure chlorine dioxide from said mixture of subtantially pure chlorine dioxide and air obtained from said supply tank.

2. The process of claim 1 wherein the pH of said first anolytic mixture is from 4 to 7.

3. The process of claim 1 wherein said electrolytic cell comprises a diaphragm electrolytic cell.

4. The process of claim 3 wherein said diaphragm comprises a cation exchange membrane.

5. The process of claim 3 wherein said electrolytic cell comprises a bipolar diaphragm electrolytic cell.

6. The process of claim 3 wherein said electrolytic cell comprises a unipolar diaphragm electrolytic cell.

7. The process of claim 1 wherein said diluent consists essentially of water.

8. The process of claim 1 wherein said diluent consists essentially of hydrochloric acid.

9. The process of claim 1 wherein the pH of the anolyte forwarded from the anode compartment of the electrolytic cell to the stripping tank is less than 2.0.

10. The process of claim 1 wherein the amount of chlorine dioxide present in said first and second mixtures comprising chlorine dioxide and air is in the range of 3 to 15 Vol %.

11. The process of claim 10 wherein the amount of chlorine dioxide is in the range of 5 to 12 Vol %.

12. The process of claim 1 further comprising maintaining the temperature of the anolyte in the stripping tank at 10° to 90° C.

13. The process of claim 3 further comprising maintaining substantially the same pressure in the anode compartment as the pressure in the cathode compartment of the diaphragm electrolytic cell.

14. The process of claim 1 further comprising maintaining the first and second mixture comprising chlorine dioxide and air and said mixture of substantially pure chlorine dioxide and air under reduced pressure.

* * * * *